(12) United States Patent
Ellithorp

(10) Patent No.: US 12,297,731 B2
(45) Date of Patent: *May 13, 2025

(54) STACKED-HELICAL GAS SEPARATOR WITH GAS DISCHARGE OUTLET

(71) Applicant: Blackjack Production Tools, LLC, Oklahoma City, OK (US)

(72) Inventor: Brian Ellithorp, Edmond, OK (US)

(73) Assignee: Blackjack Production Tools, LLC, Oklahoma City, OK (US)

(*) Notice: Subject to any disclaimer, the term of this patent is extended or adjusted under 35 U.S.C. 154(b) by 0 days.

This patent is subject to a terminal disclaimer.

(21) Appl. No.: 18/353,285

(22) Filed: Jul. 17, 2023

(65) Prior Publication Data

US 2023/0358130 A1 Nov. 9, 2023

Related U.S. Application Data

(63) Continuation of application No. 17/846,180, filed on Jun. 22, 2022, now Pat. No. 11,702,921.

(60) Provisional application No. 63/213,544, filed on Jun. 22, 2021.

(51) Int. Cl.
  *E21B 43/38* (2006.01)
  *B01D 19/00* (2006.01)

(52) U.S. Cl.
  CPC .......... *E21B 43/38* (2013.01); *B01D 19/0057* (2013.01)

(58) Field of Classification Search
  CPC .......................... E21B 43/38; B01D 19/0057
  See application file for complete search history.

(56) References Cited

U.S. PATENT DOCUMENTS

| | | | |
|---|---|---|---|
| 4,481,020 | A | 11/1984 | Lee et al. |
| 4,900,433 | A | 2/1990 | Dean et al. |
| 5,902,378 | A | 5/1999 | Obrejanu |
| 6,036,749 | A | 3/2000 | Ribeiro et al. |
| 6,723,158 | B2 | 4/2004 | Brown et al. |
| 6,932,160 | B2 | 8/2005 | Murray et al. |
| 9,045,979 | B2 | 6/2015 | Cobb et al. |
| 9,518,458 | B2 | 12/2016 | Ellithorp et al. |
| 9,909,400 | B2 | 3/2018 | Ellithorp et al. |
| 10,731,452 | B2 | 8/2020 | Ellithorp |
| 11,131,180 | B2 | 9/2021 | Ellithorp |
| 11,702,921 | B2 * | 7/2023 | Ellithorp ............ B01D 19/0057 166/265 |
| 2011/0048696 | A1 | 3/2011 | Holte |
| 2017/0266586 | A1 | 9/2017 | Hopper |
| 2020/0080408 | A1 | 7/2020 | McCoy |

(Continued)

FOREIGN PATENT DOCUMENTS

WO 2019035893 A1 2/2019
WO 2020185894 A1 9/2020

*Primary Examiner* — Catherine Loikith
(74) *Attorney, Agent, or Firm* — Tomlinson McKinstry, P.C.

(57) ABSTRACT

A wellbore gas separator having a pair of helical ramps. The separator ingests a liquid-gas solution, and a pump draws the solution into a first course between the pair of ramps. As centrifugal force is imparted upon the solution prior to the pump inlet, gas is forced out of solution. The liquid portions of the solution may fall into a dead space prior to the pump inlet. Gaseous portions enter into a second course between the pair of ramps and escapes, unimpeded, up the separator before being released into an annulus of a wellbore.

16 Claims, 5 Drawing Sheets

(56) References Cited

U.S. PATENT DOCUMENTS

2020/0141223 A1 10/2020 Brown et al.
2021/0404311 A1 12/2021 Ellithorp

* cited by examiner

STACKED-HELICAL GAS SEPARATOR WITH GAS DISCHARGE OUTLET

SUMMARY

The present invention is directed to a separator apparatus for use within a wellbore. The apparatus comprises a first tube, a housing, a first helical ramp, and a second helical ramp. The first tube has an inlet port, wherein the first tube is in communication with a pump. The housing surrounds the first tube to form a first annular region. The housing comprises a first outer port and a second outer port which are configured to allow fluid communication between the first annular region and a second annular region defined outside of the housing. The first helical ramp is disposed within the first annular region and defines a first end and a second end. The first end is proximate the first outer port. The second helical ramp is disposed within the first annular region. The second helical ramp defines a first end and a second end wherein the first end is proximate the first outer port.

The annular region is defined by a first, second and third flow path. The first flow path begins at the first outer port, which is bounded in part by the first helical ramp and the second helical ramp. The second flow path begins at the second end of the second helical ramp and is bounded in part by the first helical ramp and the second helical ramp, and ends at the second outer port. The third flow path is bounded in part by the first helical ramp and ends at the inner port.

The invention is also directed to a separator for use in a wellbore. The separator comprises a longitudinal tube having a tube port, a first helical ramp attached to an outer surface of the inner tube, and a second helical ramp attached to an outer surface of the inner tube. The first helical ramp and second helical ramp form a first helical course and second helical course. The first helical course and second helical course are disposed about the tube and bounded by the first helical ramp and the second helical ramp. The second helical course and first helical course meet at an opening proximate an end of the second helical ramp. The tube port is disposed beyond an end of the first helical ramp.

The invention is also directed to a process. The process comprises receiving a dual phase hydrocarbon feed stream comprising a liquid portion and a gaseous portion at a first port formed in a separator within a well. The process also comprises drawing the dual phase hydrocarbon stream in a downward direction along a first path to separate the dual phase hydrocarbon feed into the liquid portion and the gaseous portion. The first path revolves around a central tube.

The process further comprises receiving the gaseous portion at a gap between two ramps. The gaseous portion is drawn in an upward direction along a second path, wherein the second path revolves around the central tube and is isolated from the first path except at the gap. Finally, the process comprises expelling the gaseous portion at a second port where the portion exits the separator at a second port via a second path.

DETAILED DESCRIPTION

Figure 1:
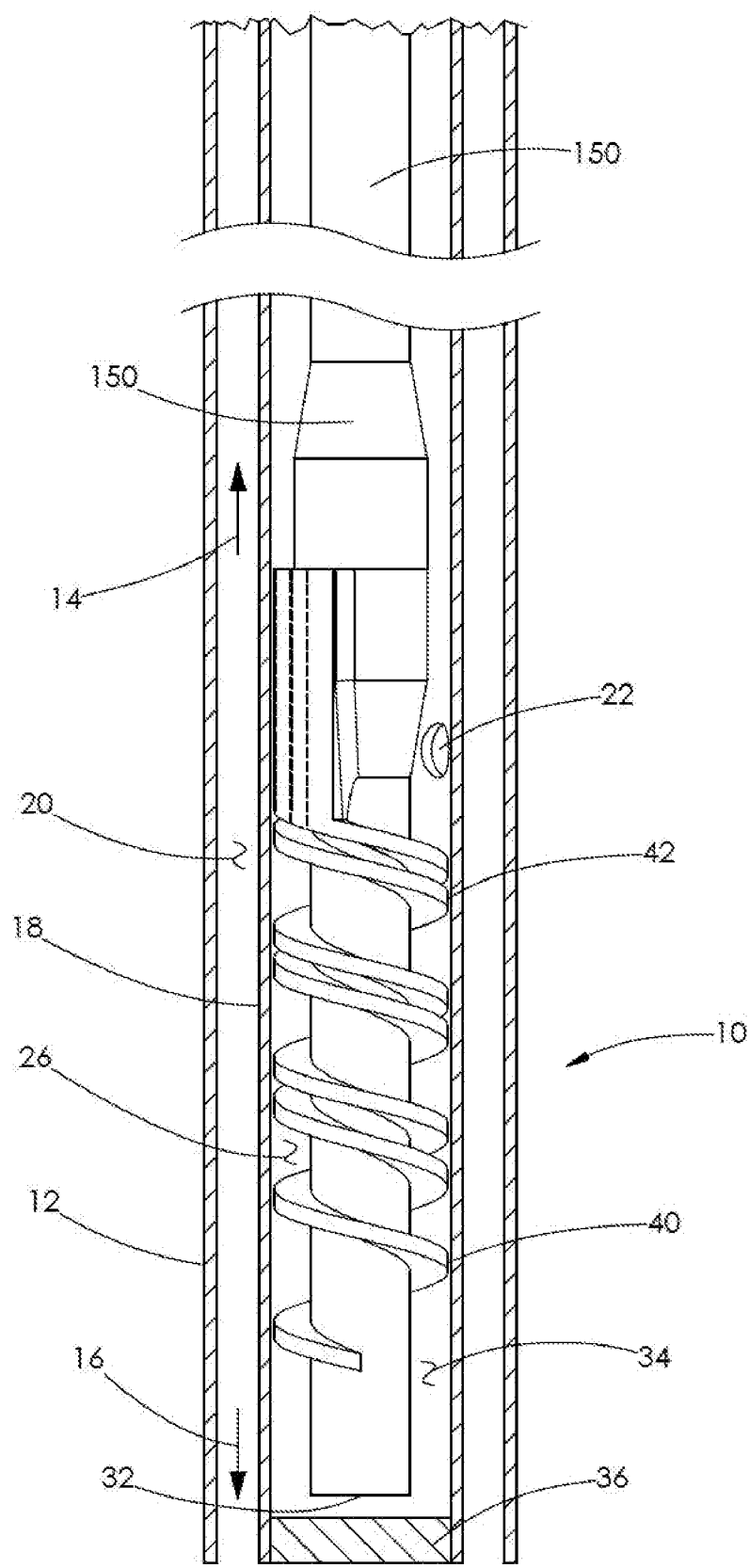
FIG. 1 is a side view of a separator for use in the present invention. The separator is within a housing that is within a wellbore. A truncation at the top of the FIG. indicates that other apparatus may be included in an uphole direction prior to connection to a production tooling string. For example, pipe may be attached to an uphole end.

In most forms of gas separators used for pumping a multi-phase solution of oil, water, and gas for separation, the solution is typically ingested through the separator's intake slots upon the pump's positive upstroke action. See, e.g., U.S. Pat. No. 9,518,458, issued to Ellithorp, et al., the contents of which are incorporated by reference herein.

In prior solutions, a single flow path could be used to separate the solution. As the solution is pulled down into the gas separator's mud anchor, the gas present in that area of the separator is anticipated through design to be incapable of reaching the lower-most intake of the dip tube. The dip tube or gas anchor length and its lowermost intake point is driven by anticipated worst-case scenario of the highest fluid volume intake possible and then the length of the "dead space" within the length is elongated even further to protect against gas ingestion upon the following strokes.

When gas is pulled into the mud anchor and ultimately into the pump, it is typically due to the fluid ingestion rate—the pace of liquid drawdown in the separator's "dead-space" is faster than the gas's ability to escape the solution. As a result, whatever volume of gas is unable to fully escape through the separator's upper intake slots during the pump's downstroke (i.e., when the pump is not ingesting anything or pulling liquids through the system) is subject to be pulled down through the unit's dead space again.

In addition, the newly ingested gas of the multi-phase solution may be similarly pulled, before possibly being forced into the gas anchor intake upon successive strokes. This result is extremely undesirable since it causes significant gas interference in the pump stroke and what is referred to as "incomplete pump fillage" which may lead to a variety of costly system failures that require remediation. With proper monitoring you will see dynamometer information exhibiting "gas interference cards" where the pump is indicated to be anywhere from less than absolutely full and more commonly very incomplete due to the pump chamber being heavily full of gas rather than the desired liquids only.

With reference to the provided drawings, a stacked-helical separator 10 is shown. The separator 10 is typically installed in a wellbore 12 having an uphole direction 14 and a downhole direction 16. The wellbore 12 may be defined by an outer casing that seals the area of the separator 10. The separator 10 is further installed in an inner casing or housing 18 which is surrounded by the wellbore 12. The space between the wellbore 12 and the housing 18 is referred to herein as the outer annulus 20.

The housing 18 has one or more lower ports 22 to provide access between the interior section of the housing 18 from the outer annulus 20. The one or more lower ports 22 function as the beginning of a first flow path 100 of the separator 10.

Figure 2:
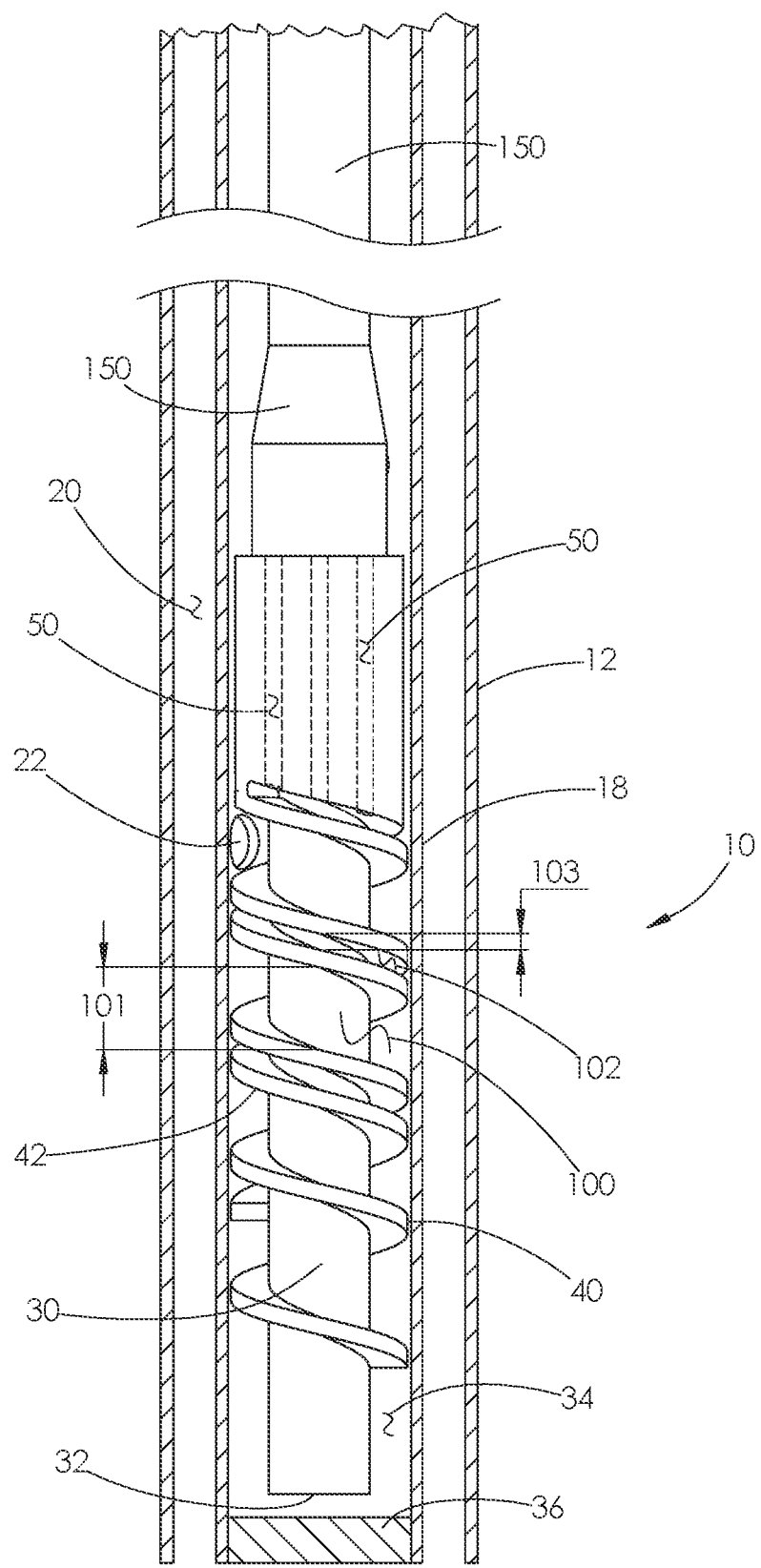
FIG. 2 is a side view of the separator of FIG. 1, taken from the left side of the separator from FIG. 1. A gap between first and second helical ramps is shown on the left side of the separator. A truncation at the top of the Figure indicates that other apparatus may be included in an uphole direction prior to connection to a production tooling string.
Figure 3:
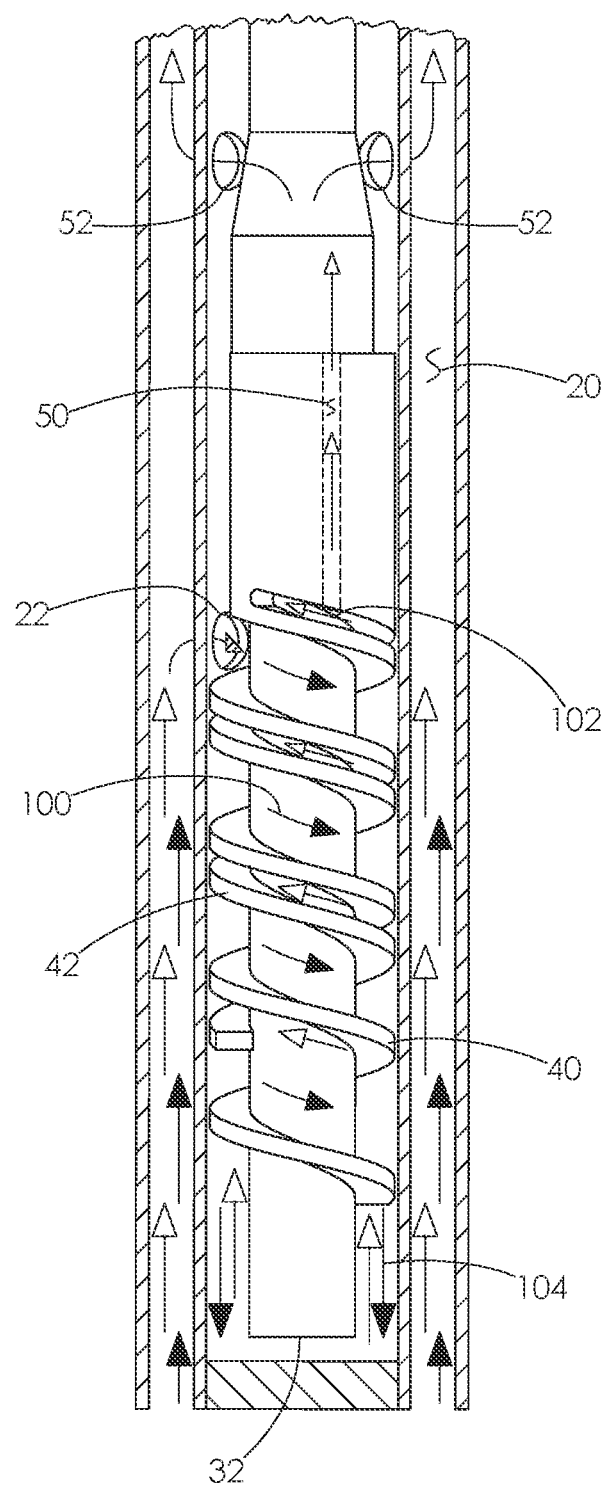
FIG. 3 is a diagrammatic representation of the flow pattern of the gas and fluid within the separator. The separator is shown inside of the housing, which is itself within a well casing. Striped arrows represent gas flow and solid arrows represent liquid flow. The arrows are shown entering the housing at first ports, and a striped arrow is shown exiting the housing at second ports. A truncation at the top of the Figure indicates that other apparatus may be included in an uphole direction prior to connection to a production tooling string.

With reference now to FIGS. 1-3, the separator 10 is connected to and part of a production tooling string 150. The separator 10 has an inner tube 30 which is in fluid communication with a pump assembly, which may be a part of the separator or may be uphole along the production tooling string. The inner tube 30 has a pump inlet 32 at an end of the tube. Fluid entering the interior section of the housing 18 from the one or more lower ports 22 falls toward the pump inlet 32 due to the localized lower pressure area created by the strokes of the pump. The pump inlet 32 is in a downhole direction from the one or more lower ports 22. From the lower ports 22 to the pump inlet 32, fluid is confined to an inner annular space 26 formed between the tube 30 and the housing 18.

The separator 10 comprises a first helical ramp 40, which is attached at one side to the inner tube 30 and on an opposite side abuts an inner surface of the housing 18. It is preferable that the first helical ramp 40 prevents the migration of fluid and gas across its surface, thus providing a restricted path through the inner annulus 26 for fluid and gas. The first helical ramp 40 terminates within a dead space area 34 of the separator 10, proximate the pump inlet 32. One of skill in the art will understand that the "dead space" area 34 refers to a relatively large volume region near the inlet where liquid is pulled into the inner tube 30. As shown, the "dead space" 34 is bounded on a downhole 16 side by a barrier 36, though a desander or other apparatus may be placed here for further processing of the liquids prior to ingestion at the pump inlet 32.

The separator 10 further comprises a second helical ramp 42. The second helical ramp 42 is attached at one side to the inner tube 30 and on an opposite side abuts an inner surface of the housing 18. It is preferable that the second helical ramp 42 prevents the migration of fluid across its surface, and provides a restricted path through the inner annulus 26 for fluid.

The second helical ramp 42 terminates at a location uphole from the termination of the first helical ramp 40. A gap 44 between the first helical ramp 40 and the second helical ramp 42 at the terminus of the second helical ramp allows access to a separate outflow channel, a second flow path 102 for the gas that has entered the dead space area 34. As shown in the figures, when the pair of helical ramps 40, 42 are closest, the first helical ramp 40 is the upper ramp, and the second helical ramp 42 is the lower ramp. The gap 44 may be approximately 0.3", and may remain constant over the course of the entire second helical ramp 42, resulting in a course having a constant height 103. Alternatively, the gap 44 may be wider than other portions of the second flow path 102, resulting in a variable height 103. The first flow path 100 is located within a course which is formed by the first 40 and second 42 helical ramps, and has a height 101. Preferably, the height 101 of the first flow path 100 course is larger than that of the height 103 of the second flow path 102 course.

Material entering the separator upon an intake stroke of the pump at the first port 22 will thus enter the first flow path 100. Material may then follow the first flow path along a path which may make revolutions around the inner tube 30, imparting centrifugal force to the material and encouraging separation of gas from within the material. Preferably, the first flow path 100 makes two to three revolutions prior to the end of the second helical ramp 42. The first helical ramp 40 may make one or more additional revolutions prior to terminating at the dead space area 34. The path of the liquid material through the dead space area 34 into the pump inlet 32 and up the tube 30 is referred to as a third flow path 104.

Alternatively, a gap in the second helical ramp 42 may exist for forty five degrees or so of the rotation of the ramp, allowing a region for gas to enter the second flow path 102, before the second helical ramp continues to follow the first helical ramp 40. Multiple gaps may therefore be used to provide gas capture from multiple points into the same flow path 102.

This helical path will create a forced gas separation to occur due to the velocity generated and the centrifugal effects created as the multi-phase mix pulls downward through the helical course of the first flow path 100 and further down through the bottom single helical section. Upon the pump reaching its downstroke and any further drawdown of the solution that was pulled through the helical section ceases. Gas that has also coalesced at this point, will then travel rapidly upward along the underside of the first helical ramp 40 until reaching the gap 44. Gas will then be "caught" within the second flow path 102.

The separator 10 provides one or more bypass channels 50 which parallel but do not communicate with the interior of the inner tube 30. In FIGS. 1 and 2, there are multiple such bypass channels 50 shown. In FIG. 3, one channel 50 is shown. In any case, the bypass channels 50 are in communication with and form part of the second flow path 102. Gas which enters the helical course of the second flow path 102 may proceed unimpeded, before entering the bypass channels 50. The gas is allowed to flow upward freely to one or more second ports 52 formed in the housing 18, where the gas is allowed to discharge into the first annulus 20, where it proceeds in the uphole direction 14 through the annulus 20 of the wellbore 12.

These bypass channels 50 may be quite long, and for example, may be fourteen to seventeen feet apart from the spiral separator 10. The gas can be released into the annulus above all separation apparatus, allowing the gas to flow upward at its desired pace, unimpeded by any fluids. The second flow path 102, from the gap 44 to the second ports 52, provide a dedicated path free of the drawdown pace of any fluid.

Liquid material, having been separated from the gas by the helical course of the first flow path 100, forms a third flow path which is defined by accumulating within the dead space 34 and entering the inner tube 30 at the pump inlet 32 for pumping through the tube 30. Liquid material is pumped out of the wellbore 12 through a production tubing string.

This is distinguished from other forms of gas separation which have no way of capturing the outflowing gas and keeping it from flowing in an opposed direction to the next ingested fluid mix. Other solutions incorporate a very vertically oriented blade set that is intended to allow the upward flowing gas bubbles to hit the blade undersides and then flow upward in a more organized fashion upward to the discharge section, but this by no means allows a contained or unimpeded channel for this outflow function.

The function of the device is best seen in FIG. 3. In FIG. 3, gas, represented by a striped arrow, and fluid, represented by a solid arrow, enter the housing 18 of the separator 10 at the lower first ports 22 represented by the large, curved arrow. This two-phase flow travels, together, down first flow path 100—the larger portion of the helical. However, as the mixture spins, gas and liquid will tend to become separated. While liquids will tend to continue down the larger helicals towards the dead space 34 and pump entrance 32 along the third flow path 104, gas will want to travel back up. The gas will, as a result, be caught against a bottom side of the helical before being caught in the gap 44, and will travel up through the separator 10 via the second flow path 102.

Reaching the top of the helical ramps 40, 42 of the separator 10, the gas will enter a separated chamber and the bypass 50, and then escape through the upper second ports 52 and into the outer annulus 20 of the wellbore 12.

Figure 4:
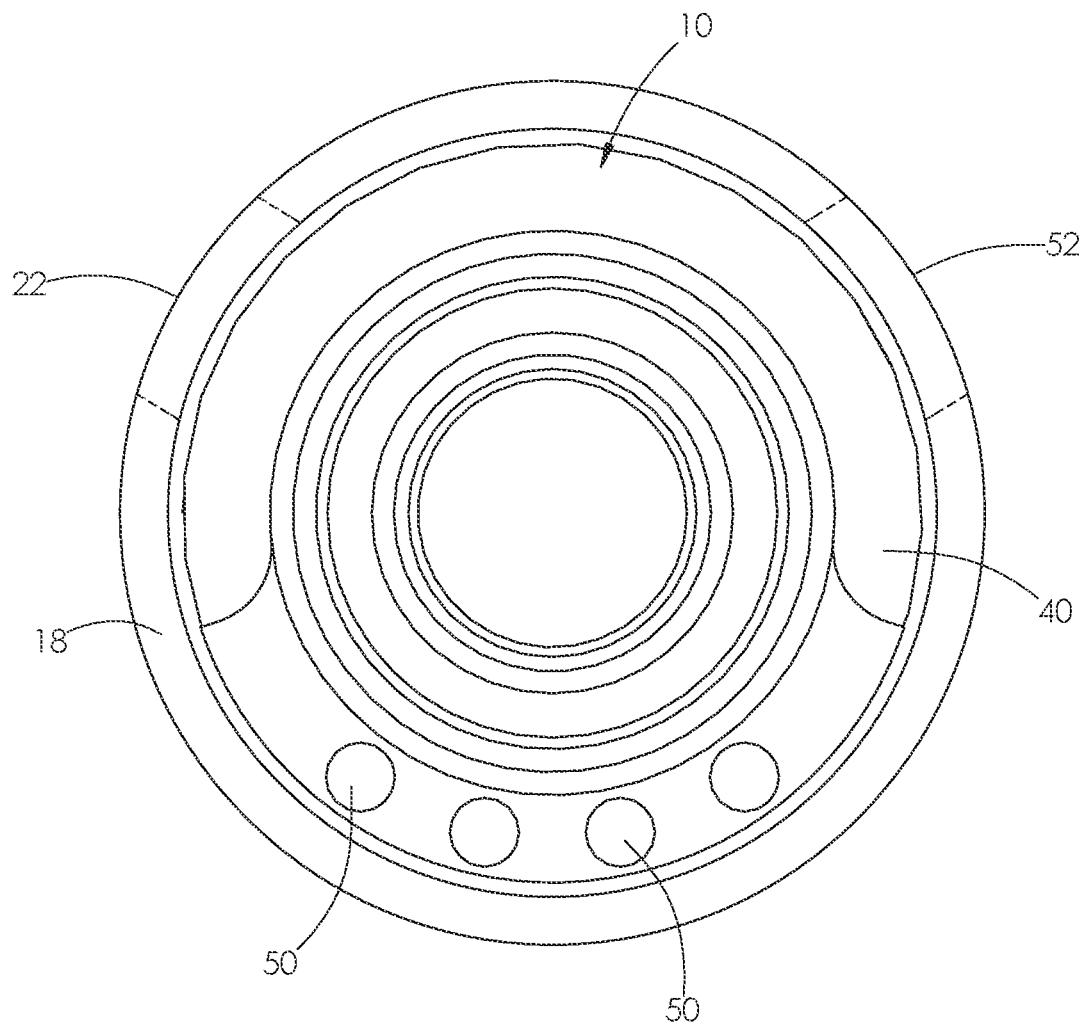
FIG. 4 is a top view of the separator of FIGS. 1-3.

FIG. 4 shows a top view of the separator 10. One of the lower first ports 22 is shown in small brackets to represent the region at which the multi-phase solution passes through the housing 18 and into the separator 10 body. The first helical ramp 40 is shown from the top in FIG. 4. The second helical ramp 42 is disposed fully beneath the first helical ramp 40 and therefore is not visible. Four bypass channels 50 are shown, a part of the second flow path 102. Isolated from the channels is the inner tube 30, by which liquids are pumped to the production tooling string.

Figure 5A:
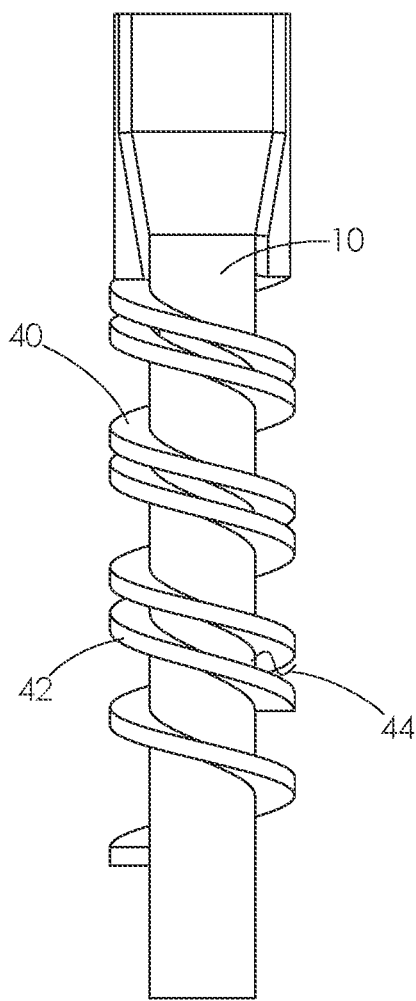
FIG. 5A is a side view of the separator of FIG. 1, taken from the right side of the separator of FIG. 1. The housing and wellbore are removed from FIG. 5A.
Figure 5B:
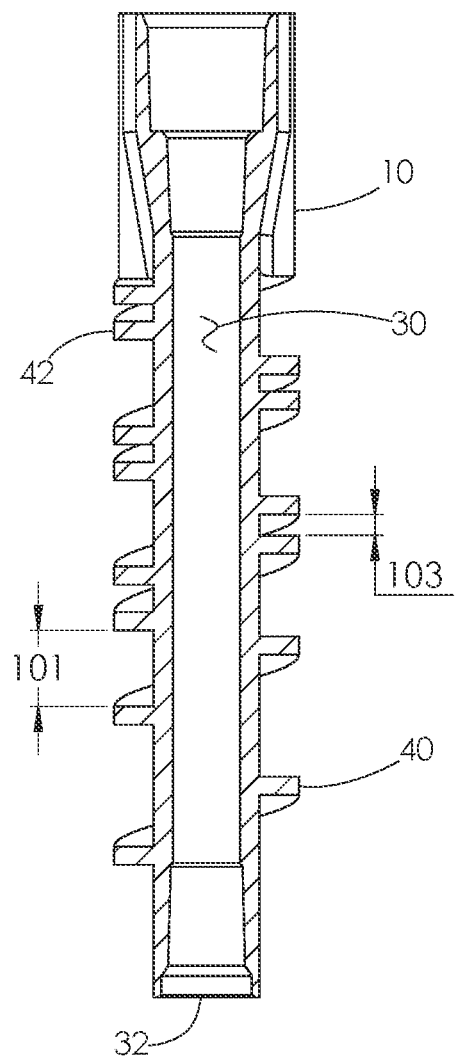
FIG. 5B is a sectional view thereof, taken from a vertical plane passing through the center of the separator and parallel to the image of FIG. 5A.

FIGS. 5A and 5B demonstrate the geometry the separator 10. In FIG. 5A, the separator is shown from the side. FIG. 5B is a sectional view of the separator 10 of FIG. 5A. In this embodiment, the vertical height 103 of the second flow path 102 increases as the first and second helical ramps 40, 42 approach the gap 44 (not shown in FIG. 5A). The bypass channels 50 are on the back side as shown in FIG. 5A. The separator 10 should be sized such that the outer surfaces of the helical ramps 40, 42 are close enough to the housing 18 (FIGS. 1-3) to prevent flow of material other than within the first flow path 100 or second flow path 102.

It is noted that the term "helical" here should be understood to be a three dimensional path both having a depth and a radial element. Neither the inner nor outer radius of any helical path should be understood to be limited to a constant. Further, each rotation of any helical path may have a constant distance between each turn, or the distance may change at an even or uneven rate.

In addition, while a helical path is shown herein, any path which imparts centrifugal force and velocity to a gas laden solution may encourage separation, and any method of encouraging gas exiting by an uninhibited path is within the spirit of the invention. For example, stacked paths which have polygonal sides that follow a circuitous route may be used.

Changes may be made in the construction, operation and arrangement of the various parts, elements, steps and procedures described herein without departing from the spirit and scope of the invention as described in the following claims.

The invention claimed is:

1. A method comprising:
   introducing at a first external opening on a separator stationed in a borehole, a two-phase hydrocarbon mixture;
   propelling the two-phase hydrocarbon mixture along a primary course to divide the two-phase hydrocarbon mixture into a fluid-rich segment and a gas-rich segment, where the primary course encircles a main tube;
   transferring the gas-rich segment into a secondary course at an intersection between the primary course and the secondary course, wherein the secondary course encircles the main tube and is disconnected from the primary course except at the intersection; and
   discharging the gas-rich segment from a second external opening positioned on the separator;
   wherein the separator includes a primary spiral incline and a secondary spiral incline, and the primary course and secondary course are partially bounded by the primary and secondary spiral inclines.

2. The method of claim 1 in which a distance between the primary spiral incline and secondary spiral incline within the secondary course is smaller than a distance between the primary spiral incline and the secondary spiral incline within the primary course.

3. The method of claim 1, further comprising directing the fluid-rich segment along a tertiary course that is partially bounded by the primary spiral incline and terminates at an entrance point of the main tube.

4. The method of claim 3 in which a fluid dead space surrounds the main tube within the tertiary course.

5. The method of claim 3 in which the fluid-rich segment adopts a spiral course for at least a portion of the tertiary course.

6. The method of claim 3 further comprising pumping the fluid-rich segment into the main tube.

7. The method of claim 1 wherein the borehole is characterized by an uphole direction and a downhole direction, and wherein:
   the two-phase hydrocarbon mixture travels in the downhole direction along the primary course; and
   the gas-rich segment travels in the uphole direction along the secondary course.

8. A process comprising:
   receiving, at a first port formed in a separator within a well, a dual phase hydrocarbon feed stream comprising a liquid portion and a gaseous portion;
   drawing the dual phase hydrocarbon stream in a downward direction along a first path to separate the dual phase hydrocarbon feed into the liquid portion and the gaseous portion, wherein the first path revolves around a central tube;
   pumping the liquid portion to initiate ingestion of the dual-phase hydrocarbon feed stream into the first port;
   receiving, at a gap between two ramps, the gaseous portion, such that the gaseous portion is drawn in an upward direction along a second path, wherein the second path revolves around the central tube and is isolated from the first path except at the gap; and
   expelling the gaseous portion at a second port wherein the gaseous portion exits the separator at the second port via the second path.

9. The process of claim 8 further comprising desanding the liquid portion after the gaseous portion is separated.

10. The process of claim 8 wherein the first path is helical and the second path is helical.

11. The process of claim 8 further comprising ingesting the liquid portion into the central tube.

12. The process of claim 11 in which the liquid portion follows a helical path along at least a portion of a path between the gap and the central tube.

13. The process of claim 8 in which one of the two ramps extends beyond the gap.

14. The process of claim 8 further comprising:
   receiving the liquid portion and the gaseous portion at an above ground location.

15. The process of claim 8 further comprising:
   accumulating the liquid portion in a dead space area surrounding an opening in the central tube.

16. The process of claim 8 wherein the separator is attached to a production tooling string.

\* \* \* \* \*